Patented Dec. 2, 1947

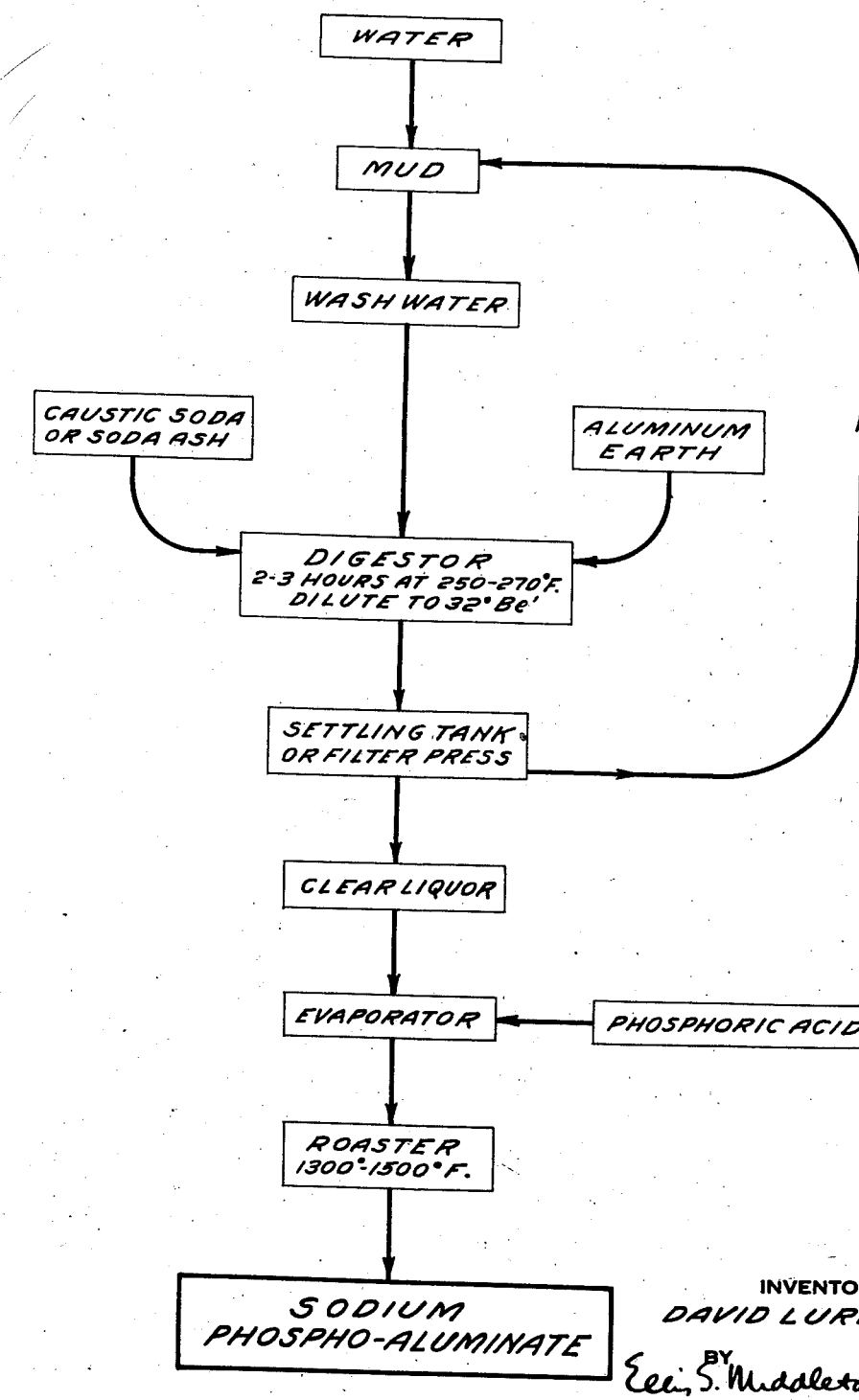

2,431,946

UNITED STATES PATENT OFFICE 2,431,946

SODIUM PHOSPHATE ALUMINATES

David Lurie, Joliet, Ill., assignor, by mesne assignments, to American Cyanamid Company, New York, N. Y., a corporation of Maine Application March 22, 1944, Serial No. 527,549

8 Claims. (Cl. 252—135)

The present invention relates to the preparation of a material containing sodium, phosphorus, and aluminum which, for lack of a better name, will be hereinafter referred to as sodium phosphoaluminate.

The principal object of the present invention is the production of a material useful for all purposes for which sodium aluminate is now adapted, but which may be manufactured with greater facility and from materials more readily available.

Another important object of the invention is the production of a substitute for sodium aluminate which will be completely stable in dilute aqueous solutions.

Another important object is the production of such a material from all grades of aluminum-bearing earths which do not contain an excessive amount of silica rather than the expensive and comparatively rare aluminous earths required for the production of a high grade sodium aluminate.

The method of the present invention is illustrated in the accompanying flow sheet which shows a preferred manufacturing process.

The invention, in a broad aspect, contemplates the wet digestion of an aluminum bearing earth with an excess amount of alkali such as caustic soda until the aluminum content has been solubilized, separating out the insolubles and neutralizing the excess caustic in the solution with phosphoric acid, followed by evaporation and roasting to form a solid product.

Specifically, in the digestion state, a sodium aluminate solution is formed which, because of the presence of excess caustic, is stable and does not hydrolyze. The insolubles formed at this stage such as the non-reactable ingredients in the bauxite; to wit, iron oxide, titanium oxide and silica are removed by filtering or settling.

The clear liquor is then analyzed to determine the amount of excess caustic present and the calculated quantity of phosphoric acid needed to neutralize this excess added, preferably during the evaporation procedure.

After a suitable concentration, the thick syrupy liquid is charged into a roaster where the reaction is completed and a dry product results.

For instance, into a digester may be charged 1000 pounds of solid caustic soda and 1000 pounds of water and this mixture heated to boiling. 1400 pounds of bauxite may then be added gradually and the digestion conducted at a temperature from 250–270° F. for from 2–3 hours. The amount of caustic soda used represents approximately 30% excess over that required theoretically for complete reaction with the bauxite.

After digestion as above, the charge is diluted with water, preferably wash water, to approximately 30° Bé., and the insolubles removed as by settling or filtering. The filter cake or mud may be washed with water and this wash water containing some values used to dilute the digestion liquor.

The clear liquor from the insoluble removal step is then passed to an evaporator and the amount of phosphoric acid needed to neutralize the excess caustic calculated. In the present instance it required approximately 240 pounds of 75% phosphoric acid. This acid was then added to the clear liquor and the mixture evaporated to a syrupy consistency. That is, evaporation was continued until its specific gravity was from 1.5–1.6. This required heating for from 2–3 hours.

At this point the syrup was charged into a roaster where it was calcined for about 3 hours, at from 1300–1500° F.

The analysis of the finished material was as follows:

| | Per cent |
|---|---|
| Water insolubles | None |
| Sodium calculated as $Na_2O$ | 44.9 |
| Aluminum calculated as $Al_2O_3$ | 43.5 |
| Phosphorus calculated as $P_2O_5$ | 7.8 |
| Silicon calculated as $SiO_2$ | 1.0 |
| $CO_2$ | 2.3 |
| Undetermined | 0.5 |

It is to be understood that soda ash may be substituted for caustic soda and that a lower grade bauxite or other aluminum bearing earth may be used. When soda ash is substituted for caustic soda wet digestion cannot be employed. The mixture of aluminous earth and the alkali must be calcined at high temperatures.

Likewise, caustic potash may be used when a potash phospho-aluminate is desired.

The product thus obtained is more readily soluble in water and in dilute solutions is more stable than the purest grade of sodium aluminate. In the manufacture of the latter product it is necessary to use aluminum hydrate which is an expensive and scarce commodity, while by the above process, a superior product can be obtained from low grade aluminous-bearing earths without using any material not readily available.

The sodium phosphoaluminate of the present invention is stable in dilute solutions, i. e., 3% to 5% aqueous solution, and does not hydrolyze even upon prolonged standing which is one of the objections to the use of sodium aluminate.

Sodium phosphoaluminate has commercial application to all uses for which sodium aluminate has heretofore been adapted, particularly in the manufacture of paper as an aid in pH control, increasing the efficiency of sizing materials and to assist in the retention of filler and fiber.

This material is also useful as a detergent particularly in washing of greasy containers, bottle washing by bottling works and dairies, the treatment of boiler feed waters and for other purposes.

By variations in the ratio of caustic, aluminous raw material and neutralizing agent, the ratios of sodium to aluminum to phosphorus in the composition may, of course, be varied within reasonable limits.

For instance, we have found that by such variations we may change the ratio of the principal ingredients as follows:

| | Per cent |
|---|---|
| Sodium calculated as $Na_2O$ | 43.0–45.0 |
| Phosphorus calculated as $P_2O_5$ | 7.0–13.0 |
| Aluminum calculated as $Al_2O_3$ | 38.0–44.0 |

Sodium phosphoaluminate may be obtained as a crystalline material by dissolving the furnace product in water, concentrating the same and cooling until crystals are obtained. The compositions of the crystals will, of course, vary depending upon the ratio of the principal ingredients of the furnace product. For instance, crystals have been formed in which the principal ingredients existing as follows:

| | Per cent |
|---|---|
| Sodium calculated as $Na_2O$ | 21.0–23.0 |
| Phosphorus calculated as $P_2O_5$ | 9.0–11.0 |
| Aluminum calculated as $Al_2O_3$ | 12.0–16.0 |

While the invention has been described with specific reference to particular embodiments, it is to be understood that it is not to be limited thereto but is to be construed broadly and restricted solely by the scope of the appended claims.

What is claimed:

1. A method of producing a material containing compounds of alkali metal, phosphorus and aluminum which includes the steps of wet-digesting an aluminous-bearing earth with alkali metal hydroxide in a quantity in excess of that required to solubilize the aluminum content of the earth, separating out the insolubles, neutralizing the excess alkali metal hydroxide with phosphoric acid, and evaporating and roasting the neutralized product.

2. The method of claim 1 in which the digestion is carried out at from 250°–270° F.

3. The method of claim 1 in which the phosphoric acid is added during the evaporation stage.

4. The method of claim 1 in which the roasting takes place at from 1300–1500° F.

5. A method of manufacturing a material containing compounds of sodium, phosphorus, and aluminum which includes the following steps, wet digesting caustic soda and bauxite in substantially the ratio of 1000 pounds of the former to 1400 pounds of the latter for from 2–3 hours at from 250–270° F., diluting the digested material to substantially 30° Bé., separating the insolubles, neutralizing the excess caustic with phosphoric acid in substantially the proportion of 240 pounds of 75% acid, and roasting the neutralized product at from 1300–1500° F.

6. A furnace product comprising the following principal ingredients in substantially the following ratios:

| | Per cent |
|---|---|
| Sodium calculated as $Na_2O$ | 43.0–45.0 |
| Phosphorus calculated as $P_2O_5$ | 7.0–13.0 |
| Aluminum calculated as $Al_2O_3$ | 38.0–44.0 |

7. A crystalline product obtained by dissolving the product of claim 6 in water, evaporating and cooling the same to obtain crystals having substantially the following compositions:

| | Per cent |
|---|---|
| Sodium calculated as $Na_2O$ | 21.0–23.0 |
| Phosphorus calculated as $P_2O_5$ | 9.0–11.0 |
| Aluminum calculated as $Al_2O_3$ | 12.0–16.0 |
| Water of composition | Remainder |

8. A furnace product comprising the following principal ingredients in substantially the following ratios:

| | Per cent |
|---|---|
| Potassium calculated as $K_2O$ | 43.0–45.0 |
| Phosphorus calculated as $P_2O_5$ | 7.0–13.0 |
| Aluminum calculated as $Al_2O_3$ | 38.0–44.0 |

DAVID LURIE

REFERENCES CITED

The following references are of record in the file of this patent:

UNITED STATES PATENTS

| Number | Name | Date |
|---|---|---|
| 1,157,436 | Spence et al. | Oct. 19, 1915 |
| 2,066,209 | Lurie | Dec. 29, 1936 |
| 2,345,134 | Lindsay | Mar. 28, 1944 |
| 2,395,126 | King | Feb. 19, 1946 |